March 23, 1943.  E. W. KELLOGG  2,314,406
PROJECTION PRINTER
Filed Oct. 31, 1939
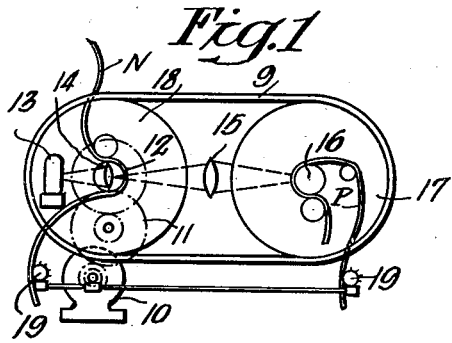
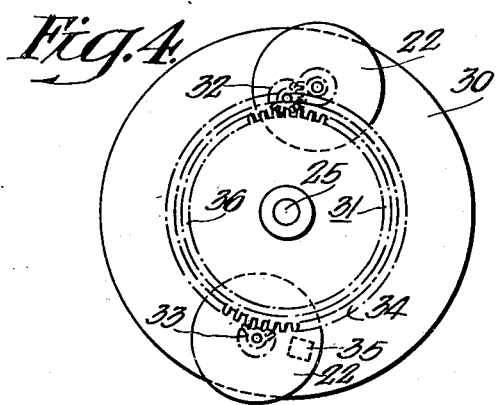
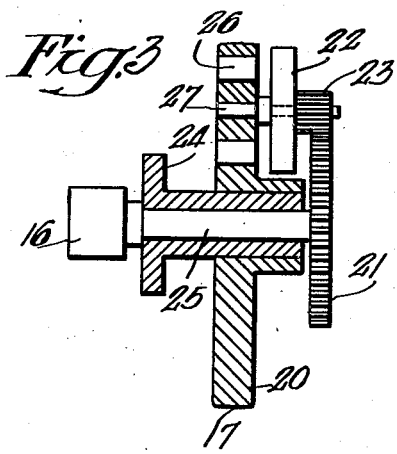
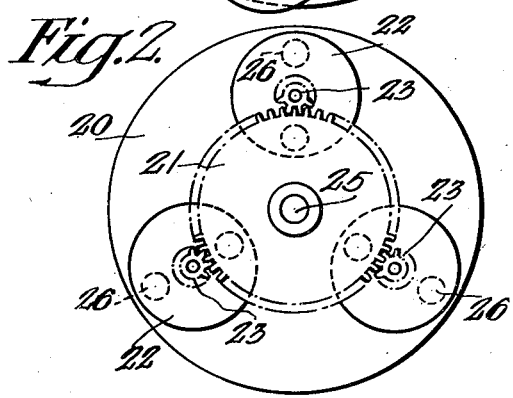
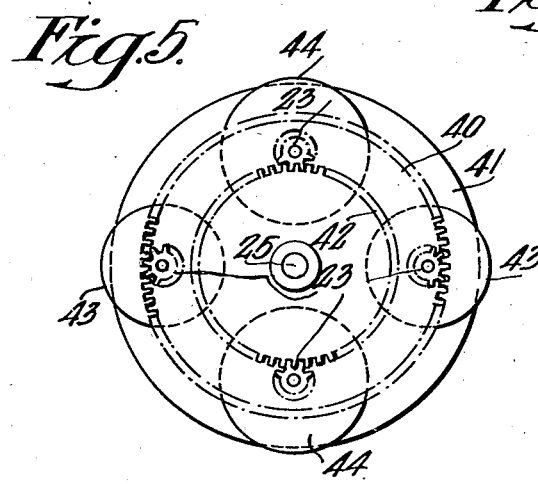
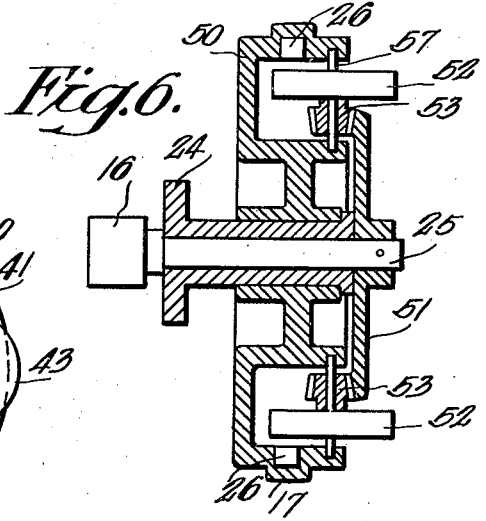
INVENTOR
Edward W. Kellogg
BY
ATTORNEY Patented Mar. 23, 1943

2,314,406

UNITED STATES PATENT OFFICE 2,314,406

PROJECTION PRINTER

Edward W. Kellogg, Moorestown, N. J., assignor to Radio Corporation of America, a corporation of Delaware Application October 31, 1939, Serial No. 302,262

4 Claims. (Cl. 271—2.3)

This invention relates to a projection printer peculiarly adapted for the printing of sound track on motion picture film. In its broader aspects, the invention also involves a novel mechanism for maintaining a constant speed difference between two rotating bodies or shafts.

In the printing of motion picture films, it is necessary to compensate for the shrinkage of the negative which has been developed, fixed and dried, and which may have further dried out considerably due to age. This shrinkage of the negative film may amount to as much as 1%. In the printing of pictures, it is customary to align the films by means of the sprocket holes, since, of course, the number of sprocket holes does not change with the shrinkage of the film. In the printing of sound track, however, it is necessary to compensate for the shrinkage. For example, 1000 feet of negative film will have shrunk to 990 feet and this must be printed on 1000 feet of positive film in proper relation to the pictures thereon. This requires that the positive film be fed through the printer at a speed very slightly greater than the speed of the negative film, and that this speed difference shall be substantially uniformly distributed over the length of the film, or at least distributed in proper relation to the shrinkage which may be slightly greater at some portions than at others. The average speed may be determined by feeding the film over sprockets so that the same number of sprocket holes of each film pass the printing point in a given length of time. However, the sprockets cannot be satisfactorily used for feeding the film past the printing point since either the longer film will slip slightly when released by each sprocket tooth or the shorter film will be pulled ahead slightly when grasped by successive sprocket teeth, in either case modulating either the exposure or the frequency of the recorded tones or both, at a cyclic rate corresponding to the sprocket tooth frequency of 96 cycles per second. In order to avoid this, it is desirable that the films should both be fed at a uniform speed past the printing point. It has heretofore been attempted to maintain the film speeds uniform by feeding both films at the same number of sprocket holes per unit of time, and by carrying each film past the printing point by some mechanism tending to produce a perfectly uniform movement thereof. For example, printers have been made in which the films were independently fed past the printing point by a magnetic drive such as that shown in my Reissue Patent No. 19,270, or in an alternative design they were fed past the printing point by a mechanism such as shown in Loomis et al. Patent 2,019,147 issued October 29, 1935. Although such printers were highly satisfactory, they nevertheless depended upon the attaining independently of two constant speeds for their operation, and even though the negative might have been made on a constant speed machine, the print may show the effect of speed fluctuations depending on the resultant of the deviations from constant speed, of both of the film feeding devices in the printer.

If it can be arranged that both films will be fed by a single constant speed device, there will be no deviations in the pitch of the recorded tones from the values on the negative, but feeding both films with the same device does not permit any adjustment in the total length of print-film printed from a given length of negative. It is desirable that the two driving systems be endowed with the characteristic of acting substantially like a single unit, which moves both films in a fixed speed ratio, but that the action of one or the other of the films shall be capable of automatically producing a small difference in speed, which difference shall itself tend after once being established to remain at a fixed value, or to change only very gradually. Thus if the two film propelling systems are independent, a departure of either one of them from constant speed will result in a 1% error in the pitch of the printed tone, but if both films are driven by a single device, but a supplementary device takes care of a continuous speed difference of 1%, then said supplementary device may fail to operate at constant rate by as much as 10% of its own speed without causing more than a 0.1% error in the pitch or frequency of a printed tone.

In the present apparatus, although a constant speed is desirable, I attain a constant speed difference independent of the absolute speed of the films.

One object of the invention is to provide an improved film feed means.

Another object is to provide an improved projection printer.

Another object of the invention is to provide an improved mechanism for moving two films with a constant speed difference.

Another object of the invention is to provide a mechanism for maintaining the speed difference between two rotating members constant.

Other and incidental objects of the invention will be apparent to those skilled in the art from a reading of the following specification and an inspection of the accompanying drawing in which—

Figure 1 is a diagrammatic side view of a projection printer made in accordance with my invention, Figure 2 is a side view of one form of mechanism for maintaining the constant speed difference, Figure 3 is a vertical section through Fig. 2, Figure 4 shows a modified form of the device for maintaining a constant speed difference, Figure 5 shows a second modification of the apparatus for maintaining a constant speed difference, and Figure 6 is a vertical section through a third modification of the said apparatus.

Referring first to the projection printer shown in Fig. 1, the negative film N is moved down around the drum 12 by an appropriate driving mechanism operated by a motor 10. The rate of feed of this film may be controlled by an appropriate sprocket 19 driven by the motor 10, and the drum itself may be driven through the gear 11 and a magnetic drive such as shown in my Reissue Patent No. 19,270. An appropriate light source 13 is provided from which light is directed on to the negative film by a condenser lens 14. An appropriate optical system, which in the present case is illustrated as a lens 15, is provided to form an image of the illuminated area of the negative film 12 upon the positive film stock P. This positive stock passes around the drum 16 in the opposite direction to the direction of movement of the negative film N. The average rate of movement of the film P may be controlled by a second sprocket 19 which causes the same number of sprocket holes of the positive stock to pass the printing point as of the negative stock.

An appropriate pulley 18 is provided integral with the drum 12, and a second pulley 17 is provided coaxial with the drum 16, the pulleys 17 and 18 being connected by an appropriate belt, whereby pulley 17 revolves at a speed having a fixed ratio to that of the negative drum 12 and its pulley 18.

Referring now to Fig. 3, wherein the construction of the device for driving the positive film of Fig. 1 is illustrated in detail, the pulley 17 may be considered as the outer rim of a circular member 20 which is preferably somewhat massive so as to have more or less of a flywheel action. This member 20 rotates on a fixed bushing 24 within which rotates the shaft 25 of the drum 16. Flywheels 22 are carried on the member 20 by their shafts 27 and are connected by the pinions 23 to the gear 21 fixed on the shaft 25. Appropriate damping magnets 26 may be carried by the member 20 in appropriate relation to the flywheels 22 to damp any tendency for these flywheels to oscillate.

Referring now to the operation of the apparatus of Fig. 2 as included in the member 17 in Fig. 1: It will be apparent that when the apparatus is started the drum 12 will be brought up to speed by the magnetic drive and both films N and P will be caused to move at a uniform number of sprocket holes per unit of time by the sprockets. The pulley 20 will be accelerated by the belt 9, while the drum 16 will be brought up to speed either by its coupling through the flywheels 22 to pulley 20, or by the film P, or by both jointly. The length of the film P which is fed around drum 16 in a unit of time, as determined by the rotation of sprocket 19 and the degree of shrinkage of the film P, may call for a speed of drum 16 which differs slightly from the speed of pulley 20. Under these conditions, the film will begin to exert a slight tractive force on drum 16, tending, for example, to slow it down. Thereupon, the flywheels 22 begin to rotate on their axes at a speed corresponding to the required speed difference between the gear 23 on the shaft with drum 16 and the pulley member 20. The flywheels keep the speed difference at a constant value, while the film P must continue to exert sufficient traction on drum 16 to overcome the friction in the gears and bearings of flywheels 20.

It will be appreciated that my invention is not limited in its application to a printer wherein both films move at approximately the same speed, although for simplicity in explanation I have described a printer wherein this is the desideratum. The invention can be applied as well to a reducing or enlarging printer where some other specified ratio between the negative and positive prints is required. For example, if used in a reduction printer for printing from 35 mm. film to 16 mm. film, the relative diameters of either the drums or the pulleys may be changed to give the proper linear film speeds. Further, it is not necessary so far as the principle of operation of my invention is concerned that the rotating member, such as 20, rotate at substantially the same speed as the gear 21, as the relative speeds of these two members may be in any desired ratio, in which case, of course, the ordinary velocity of the flywheels 22 will be correspondingly greater. It is preferable, however, for the reasons already pointed out that the speed difference between the coaxial members shall be small relative to their average speed.

For the small flywheels to remain stationary on their shafts, or, in other words, stationary with respect to the carriage on which they are mounted, in order to provide zero slip, their absolute rotation must be at the same rate as the rotation of the drive wheel. During the acceleration of the system, there is no adequate means of imparting this rotation, and the small wheels will therefore tend to rotate backward with reference to the driving wheel and therefore produce slip. It is desirable that their rotation be controlled solely by the tension of the film, or, in other words, that the process of accelerating the machine shall not set the small flywheels in rotation on their axes. The most satisfactory way of bringing about such a result is to employ an even number of flywheels and connect them in such a manner that they rotate in opposite directions with reference to the driving wheel on which they are supported. Figure 4 shows an arrangement in which this is accomplished by interposing an extra gear 32 between the drum gear and one of the flywheel pinions. A counterweight 35 is indicated to balance the weight of the extra gear 32.

In this form of the invention, the pinion 33 bears against the outer set of teeth 34 on the double gear 31 and serves to drive a lower flywheel 22 in one direction. The other flywheel which is mounted at the same radial distance is connected to the inner gear 36 of the double gear 31 by means of the extra gear 32 which reverses its direction of movement.

In the form of the invention shown in Fig. 5, the flywheel shafts are again connected to a rotatable member 40, which corresponds to pulley member 20 of Figs. 2 and 3, while two gears 41 and 42 are connected together and to the drum shaft and are rotatable in relation to the member 40. The two flywheels 43 are so mounted as to engage the external gear 41, while two other flywheels 44 are mounted to engage the internal gear 42. It will be apparent that the flywheels 43 rotate in one direction, while the flywheels 44 rotate in the opposite direction. Since the flywheels 44 will rotate at a slightly slower speed than the flywheels 43, the flywheels 44 should be made enough larger or their pinions enough smaller so that their rotational inertia corresponds with that of the flywheels 43.

In the form of the invention shown in Fig. 6, the flywheels are mounted with radial axes. In this arrangement, the pulley 17 surrounds an annular channel member 50 within which the flywheels 52 are mounted. A bevel gear 51 replaces the gear 21 and bevel pinions 53 are provided to engage the bevel gear 51. In this arrangement, there is no tendency for acceleration or deceleration of the member 50 to cause rotation of the flywheels 52.

It will be apparent that in all of the foregoing arrangements, since it is contemplated that the apparatus will operate with small speed differences, the rotational speed of the flywheels will be relatively slow, except insofar as the small difference is magnified by a high gearing ratio. It is desirable to avoid the irregularities in motion which might follow from the irregularities in the gear teeth. This may be accomplished by employing fine-toothed accurately cut gears and taking out all avoidable backlash. For the last-mentioned purpose, the pinions may be made in two halves connected together by a spring, tending to rotate the two parts of the pinion in relation to each other, only one of the pinion halves being fixed to the shaft. Likewise, the combination of a toothed gear and a friction gear is well known where the friction gear tends to smooth out minor irregularities in the motion of the toothed gear, or a friction drive might be employed alone.

The arrangement of flywheels shown is entirely diagrammatic and many alternative and equivalent arrangements will be apparent to those skilled in the art, including the arrangement of the flywheels coaxial with the driving and driven members.

I claim as my invention:

1. In combination, means for feeding a strip of material at a uniform speed, means for feeding a second strip of material at a uniform speed bearing a predetermined ratio to said first speed, flywheel means, and differential gearing connecting said flywheel means to both of said feeding means in such ratio that said flywheel means is activated only in response to departures from said predetermined ratio.

2. In combination, means for feeding a strip of material at a uniform speed, means for feeding a second strip of material at a uniform speed bearing a predetermined ratio to said first speed, additional means feeding said strips at speeds approximating but differing from said uniform speeds, flywheel means, and differential gearing connecting said flywheel means to both of said uniform feeding means in such ratio that said flywheel means is activated only in response to departures from said predetermined ratio caused by said additional feeding means.

3. In combination, means for feeding a strip of material at a uniform speed, means for feeding a second strip of material at a different uniform speed bearing a predetermined ratio to said first speed, flywheel means, and differential gearing connecting said flywheel means to both of said feeding means in such ratio that said flywheel means is activated only in response to departures from said predetermined ratio.

4. In combination, means for feeding a strip of material at a uniform speed, means for feeding a second strip of material at a different uniform speed bearing a predetermined ratio to said first speed, additional means feeding said strips at speeds approximating but differing from said uniform speeds, flywheel means, and differential gearing connecting said flywheel means to both of said uniform feeding means in such ratio that said flywheel means is activated only in response to departures from said predetermined ratio caused by said additional feeding means.

EDWARD W. KELLOGG.